United States Patent [19]

Mayer

[11] Patent Number: 5,161,931
[45] Date of Patent: Nov. 10, 1992

[54] WHEEL HANDLING APPARATUS

[76] Inventor: Orin R. Mayer, N34 W29865 N. Shore Dr., Pewaukee, Wis. 53072

[21] Appl. No.: 693,967

[22] Filed: Apr. 29, 1991

[51] Int. Cl.$^5$ .............................................. B60B 29/00
[52] U.S. Cl. .................... 414/427; 414/429; 414/667; 414/785
[58] Field of Search ............... 414/426, 427, 429, 667, 414/671, 785; 254/2 R

[56] References Cited

U.S. PATENT DOCUMENTS

| | | | |
|---|---|---|---|
| 2,364,918 | 12/1944 | Robertson | 414/427 |
| 2,455,432 | 12/1948 | Martin | 414/427 X |
| 2,584,240 | 2/1952 | Stewart | 414/785 X |
| 2,596,747 | 5/1952 | Ward et al. | 414/785 |
| 3,749,265 | 7/1973 | Smith, Jr. | 414/427 |
| 3,830,387 | 8/1974 | Virnig | 414/427 |
| 3,850,321 | 11/1974 | Virnig | 414/427 |
| 4,042,139 | 8/1977 | Pernsteiner, et al. | 414/427 |
| 4,050,597 | 9/1977 | Hawkins | 414/427 |
| 4,497,607 | 2/1985 | Johannson | 414/667 X |
| 4,708,576 | 11/1987 | Conley | 414/785 X |
| 4,771,531 | 9/1988 | Asher | 414/427 X |

FOREIGN PATENT DOCUMENTS

| | | | |
|---|---|---|---|
| 2307110 | 9/1974 | Fed. Rep. of Germany | 414/667 |
| 2589399 | 5/1987 | France | 414/426 |
| 2109340 | 6/1983 | United Kingdom | 414/667 |

Primary Examiner—Michael S. Huppert
Assistant Examiner—James T. Eller
Attorney, Agent, or Firm—Willis B. Swartwout, III

[57] ABSTRACT

Improved wheel and tire handling apparatus or structure including a base member adapted for movement on relatively level surfaces by the use of rollers and casters. A vertically moveable second section is adapted for movement up and down on uprights of the base member and a jack is mounted in between the base member and the second section to raise and lower the second section relative to the base member. The second section is further provided with an elongated axle extending across the second section on which are axially slideably mounted two tines. The tines can be restricted as to axial movement by the use of manually fixable slideable collars on the axle to prevent the tines from moving away from each other when a wheel and tire are received thereon. Rollers are provided for the tire receiving surfaces of the tines to facilitate rotational movement of the wheel and tire to align the wheel with lug bolts when remounting the wheel and tire.

3 Claims, 3 Drawing Sheets 5,161,931

WHEEL HANDLING APPARATUS

BACKGROUND OF THE INVENTION

Heavy vehicles such as trucks, tractors, heavy construction equipment and fork lift trucks use large heavy wheels that are difficult for a single person to handle and service.

In the past special structure has been used to remove such wheels from the vehicle and to move them around. In some cases this equipment included jack structure to raise the vehicle wheel off of the surface on which the vehicle is standing. Such structure was itself heavy and cumbersome since it was mainly used on tandem wheels for large trucks such as semi-trailer tractors and trailers and dump and cement trucks and the like.

Such structure, however, was too large and cumbersome to be easily used on smaller trucks such as a fork lift or on large garden tractors and lawn mowers. Nevertheless fork lift trucks, garden tractors and lawn mowers still have large enough and heavy enough wheels to make removing, servicing and replacing difficult for one person to accomplish.

SUMMARY OF THE INVENTION

The present invention relates to wheel removing and handling devices specifically designed to handle and service the wheels of midsized equipment such as fork lift trucks and the like.

It is an object of the present invention to provide a new and novel wheel removing and handling dolly device which includes a frame having a generally U-shaped base as viewed in horizontal plan with a vertical support structure extending upwardly therefrom. The base is provided with wheels or casters to facilitate movement of the dolly on a relatively even surface. The vertical support structure extends upwardly from the closed end of the U-shaped base. The vertical support structure has a first, stationary, section and a second movable section movable in a vertical plane both upwardly and downwardly. The vertical support structure is further provided with jack structure between the first and second sections for the raising and lowering of the vertically movable section.

It is another object of the present invention to provide structure of the character above described wherein the vertically movable section is provided with a horizontally extended cylindrical axle.

It is still another object of the present invention to provide structure of the character above described wherein the axle is provided with at least one slideably mounted tine providing lateral tine adjustment within the dolly structure to accommodate various wheel mounted tire circumferences.

It is yet another object of the present invention to provide structure of the character above described wherein there is provided an axle collar to fix the adjustable tine against further lateral movement after the tire and wheel have been received on the dolly.

It is a further object of the present invention to provide structure of the character above described wherein both tines are slideably adjustable and each tine is provided with an axle collar to fix the tine against further lateral movement after the tire and wheel have been received on the dolly.

It is still a further object of the present invention to provide structure of the character above described wherein each tine is generally L-shaped in vertical plan, each tine having a leg section and a foot section, the foot section being cylindrical in cross-sectional dimension and having a hollow cylindrical foot cover slideably mounted on each foot for rotational movement thereon.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DESCRIPTION OF THE PREFERRED EMBODIMENT

Figure 1:
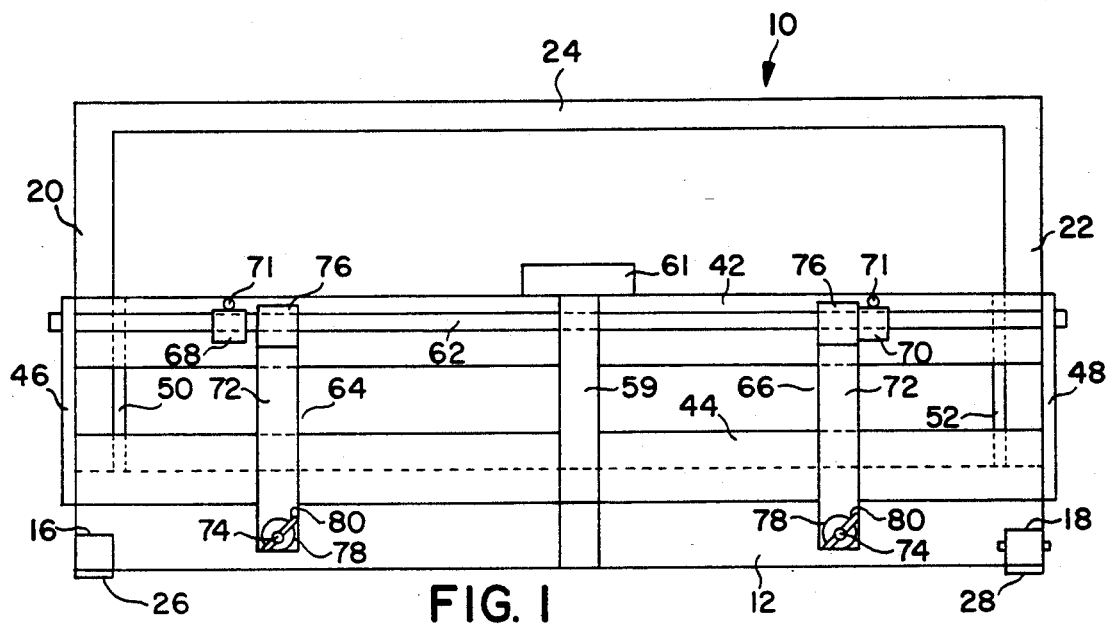
FIG. 1 is a front elevational view of a preferred embodiment of the present invention.
Figure 2:
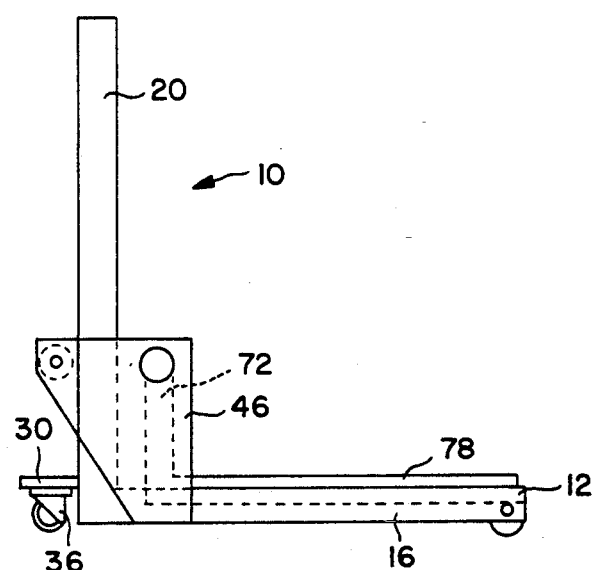
FIG. 2 is a side elevational view of the structure shown in FIG. 1.

Referring now to the drawings and more particularly to FIGS. 1 and 2 thereof, there is shown a wheel removing and handling structure generally identified by the numeral 10. Structure 10 may also sometimes herein be referred to as a wheel dolly or wheel caddy. Structure 10 includes a base 12 which is generally U-shaped in horizontal plan. Base 12 has a closed end base member 14 which is elongated and provided with a first perpendicular base member 16 at one end and a second perpendicular base member 18 at the other end perpendicular to closed end member 14 in the same horizontal plane.

Figure 3:
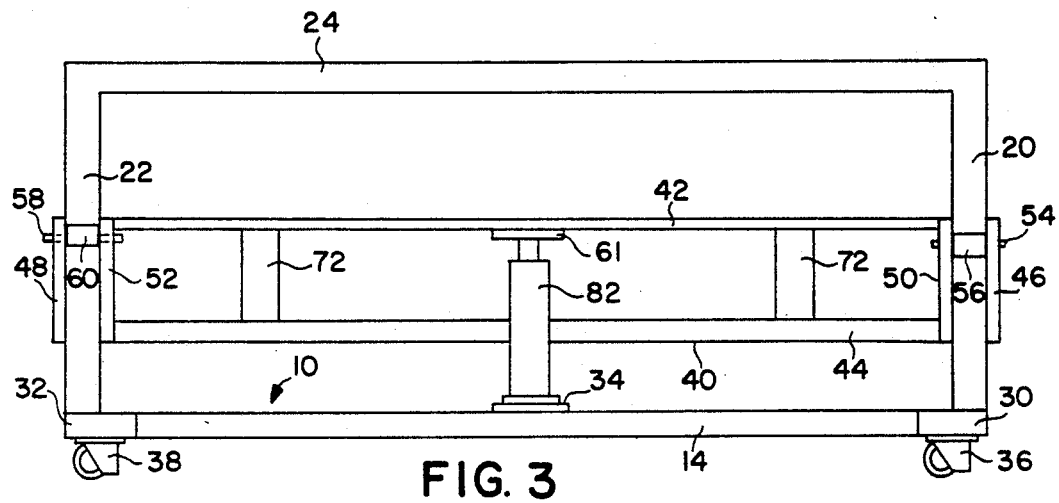
FIG. 3 is a rear elevational view of the structure shown in FIG. 1.
Figure 4:
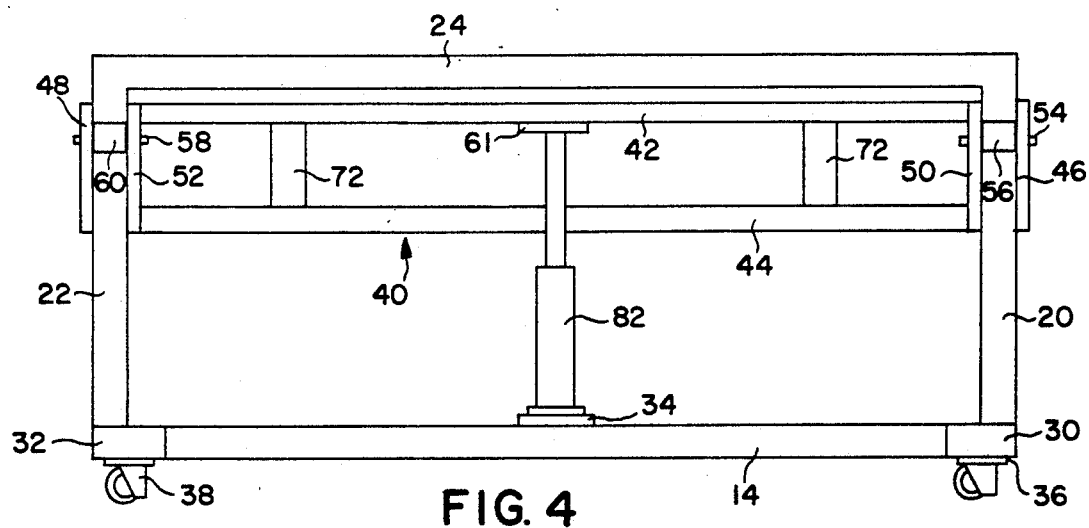
FIG. 4 is a view similar to FIG. 3 with the vertically movable structure in the raised position.
Figure 5:
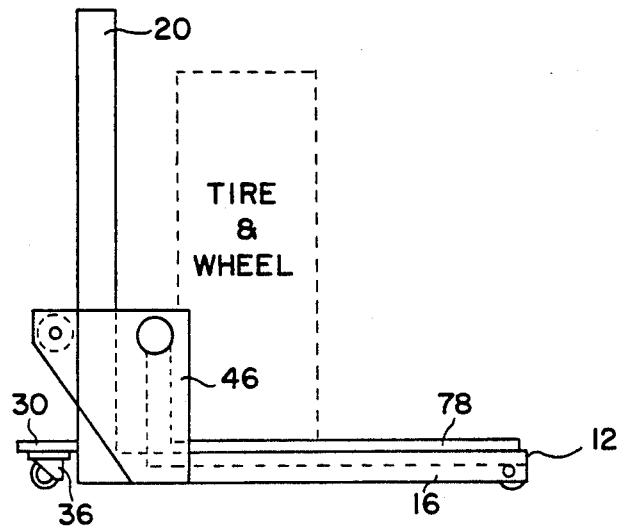
FIG. 5 is a view similar to FIG. 2 with a tire and wheel shown in ghost on the dolly.
Figure 6:
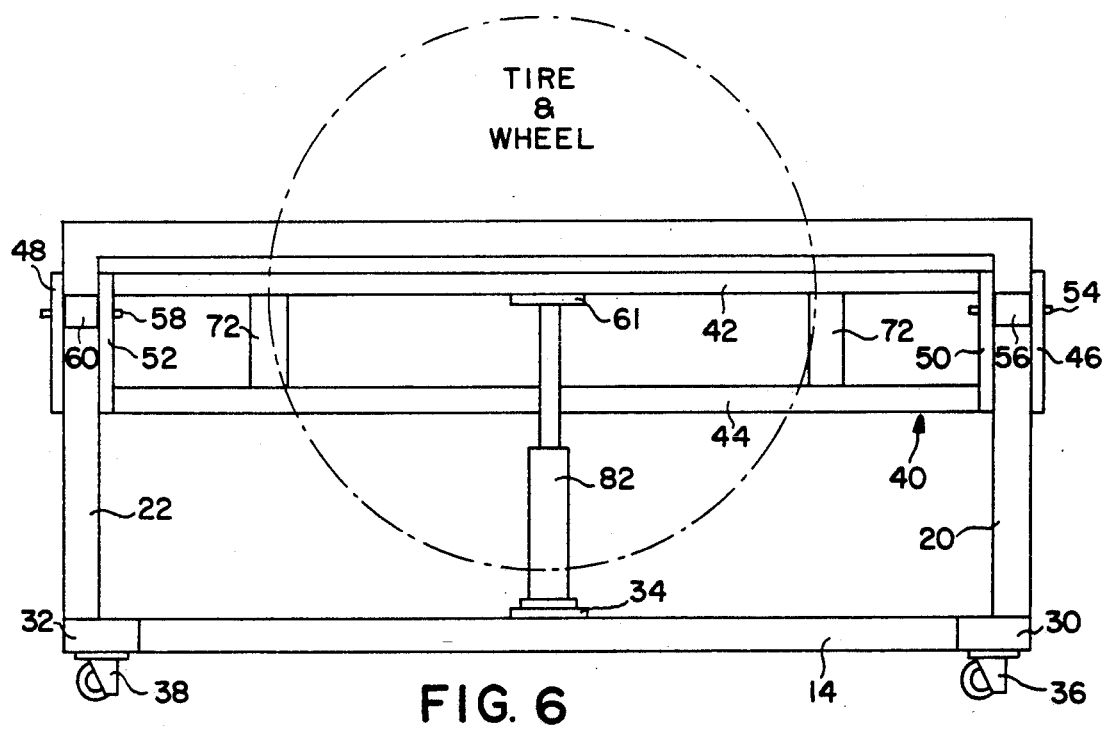
FIG. 6 is a view similar to FIG. 4 with a tire and wheel shown in ghost on the dolly.

In addition to FIGS. 1 and 2, reference is now further made to FIGS. 3 and 4, wherein there is disclosed a first upright frame member 20 fixed to closed end base member 14 at one end of member 14 and a second upright frame member 18 fixed to the other end of member 14. Upright members 20 and 22 are also perpendicular to member 14 but in the same vertical plane. The ends of upright members 20 and 22 remote from member 14 are fixed to opposite ends of an elongated first cross closure member 24 such that upright members 20 and 22 are spaced and generally parallel and such that base member 14 and first cross closure member 24 are also spaced and generally parallel.

At the end of base member 16 remote from member 14 a first roller 26 is mounted and at the end of member 18 remote from member 14 a second roller 28 is mounted. The joinders of members 14, 16, 18, 20, 22 and 24 are welds but the members could be joined in any other suitable fashion. Also welded to one end of member 14 and extending oppositely therefrom to member 16 is a first base tab 30. At the other end of member 14 remote from member 16 and extending therefrom oppositely to member 18 is a second base tab 32. Intermediate tabs 30 and 32 there is welded a central base tab 34 for the purpose for which will be hereinafter explained.

Depending from first and second base tabs 30 and 32 respectively are first caster 36 and second caster 38 respectively.

Structure 10 is further provided with a movable frame section generally identified by the numeral 40. Section 40 has an upper elongated frame section member 42 and a lower elongated frame section member 44. Upper member 42 and lower member 44 are spaced and generally parallel and are joined at one extremity of each by first upper frame end member 46 and at the other extremity of each by second upper frame end member 48. A first wing 50 is joined to upper elongated frame section member 42 and lower elongated frame section member 44 in spaced and parallel relationship to first end member 46. Both wing 50 and end member 46 are generally triangular in vertical plan such that first upright frame member 20 will fit between end member 46 and wing 50. A second wing 52 to upper elongated frame section member 42 and lower elongated frame section member 44 in spaced parallel relationship to second end member 48. Both wing 52 and end member 48 are generally triangular in vertical plan such that second upright frame member 22 will fit between end member 48 and wing 52. Apexes of the wing members 50 and 52 respectively and of first and second end members 46 and 48 respectively protrude beyond first and second upright frame members 20 and 22 such that first shoulder bolt or pin 54 and second shoulder bolt or pin 58 may be extended between the apexes of wing member 50 and first end member 46 and between the apexes of second wing 52 and second end member 48 respectively. A first frame section roller 56 is mounted for rotational movement on bolt or pin 54 and a second frame section roller 60 is mounted for rotational movement on bolt or pin 58. If a bolt is used then a nut would be provided to secure the shoulder bolt in position, however if a pin is used more likely a cotter key or cross-pin would be used to hold the pin against accidental axial withdrawal.

Intermediate the ends of one side of upper elongated frame section member 42 and intermediate the ends of one side of lower elongated frame section member 44 the upper and lower section members 42 and 44 are joined by a support strut 59. On the oppositely facing side of upper member 42 from strut 59 a flange 61 extends outwardly from member 42 directly over central base tab 34 when movable frame section 40 is in place on structure 10 for purposes which will subsequently be described.

A fixed solid cylindrical axle 62 extends from first wing 50 through strut 59 to second wing 52. Intermediate wing 50 and strut 59 a first generally L-shaped tine 64 is mounted for axially slideable movement. Intermediate wing 52 and strut 59 a second generally L-shaped tine 66 is mounted for axially slideable movement. Intermediate wing 50 and tine 64 a first slideable collar 68 is mounted on axle 62. Intermediate wing 52 and tine 66 a second slideable collar 70 is mounted on axle 62. Each of the collars 68 and 70 are provided with a set screw 71 for securing the collars in position against lateral or sliding movement on axle 62.

Each generally L-shaped tine has a leg section 72 and a foot section 74. At the end of leg section 72 remote from foot section 74 is a hollow cylindrical collar 76 of just sufficient inside diameter to slide axially on axle 62. The foot section 74 is generally cylindrical in shape and solid. Each foot section 74 is provided with a hollow cylindrical roller 78 just sufficient in inside diameter to slide axially over a foot section 74 extending from leg section 72 to a point adjacent the extremity of foot section 74 remote from leg section 72 where a cotter key or pin 80 prevents the roller 78 from axially sliding off of foot 74.

It can now be seen that placing a hydraulic or other type of jack 82 on central base tab 34 and below flange 61 will enable the operator to jack up movable frame section 40 to a desired height. Thus if a vehicle is jacked up or blocked up the structure 10 may be wheeled into position next to the tire and the tines 64 and 66 may be spaced to engage arcuately spaced surfaces of the tire. Collars 68 and 70 may then be moved next to the tine leg upper cylindrical sleeve of each tine 64 and 66 set screw 71 can secure the tine legs 72 against laterally outward movement. Raising the jack will lift frame section 40 such that when any lug nuts or bolts securing the tire to the vehicle are removed the tire may be drawn off the vehicle axle as the structure 10 is manually moved axially away from the vehicle axle.

I claim:

1. A tire and wheel handling dolly device comprising:

first and second parallel leg members, each leg member having a front end portion and a rear end portion;

a rear cross member joining said rear portions together to form a generally U-shaped frame base;

first and second upright members, each upright member having a first end and a second end, each first end being joined to said base at locations proximate said rear end portions of one of said first and second leg members and extending upwardly therefrom;

a plurality of casters mounted on said base for allowing movement of said base on a generally level surface;

an upper cross member joining said first ends of said upright members to form a first stationary section;

a second movable section mounted for vertical movement on said first stationary section;

means mounted intermediate said first stationary section and said second movable section for raising and lowering said second movable section relative to said first stationary section;

an elongated axle fixed to and extending across said second movable section;

first and second tines mounted to said axle for axial slidable movement along said axle, said tines being spaced apart by a predetermined separation distance;

a plurality of locking collars mounted to said axle for axial slidable movement along said axle, said locking collars being manually operable for selective locking engagement with said axle, wherein said locking collars abuttingly engage said tines to prevent axial movement of said tines along said axle and thereby maintain the predetermined separation distance.

2. The structure as set forth in claim 1, wherein said tines are generally L-shaped having a leg section and a foot section, and wherein the leg section of each tine is provided with a hollow cylindrical collar for slideable mounting on said axle.

3. The structure as set forth in claim 1, wherein said tines are generally L-shaped having a leg section and a foot section, and wherein said foot section is cylindrical in cross-sectional dimension and said foot section of each tine has a hollow cylindrical roller circumscribed thereover for easy rotational movement on said tines of said tire and wheel in the process of wheel and tire remounting.

* * * * *